(No Model.)
J. W. BOYD.
WIRE TIGHTENER.
No. 361,745.          Patented Apr. 26, 1887.
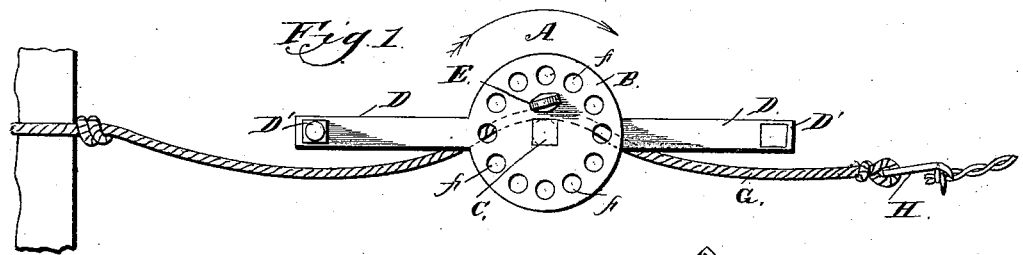
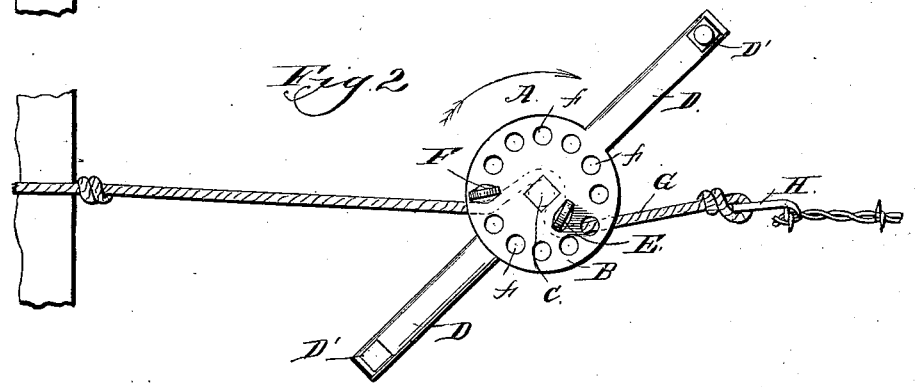
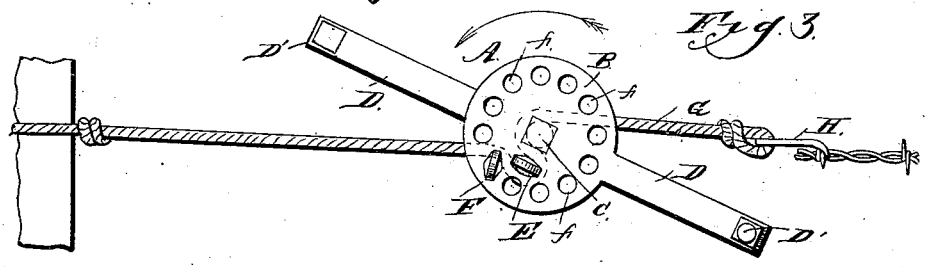
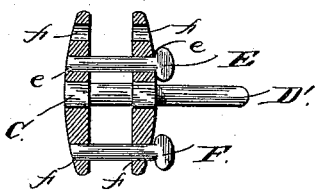
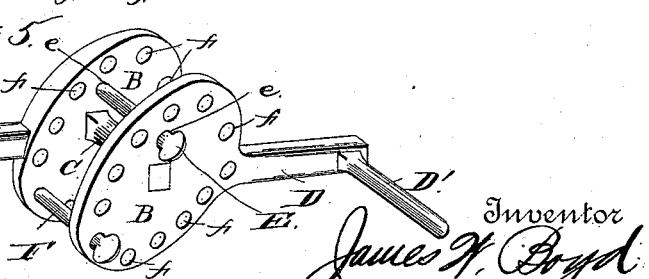
Witnesses          Inventor
Geo Thorpe,          James W. Boyd
E. G. Siggers          By his Attorneys

UNITED STATES PATENT OFFICE.

JAMES W. BOYD, OF AURORA, TEXAS.

WIRE-TIGHTENER.

SPECIFICATION forming part of Letters Patent No. 361,745, dated April 26, 1887.

Application filed February 15, 1887. Serial No. 227,698. (No model.)

*To all whom it may concern:*

Be it known that I, JAMES W. BOYD, a citizen of the United States, residing at Aurora, in the county of Wise and State of Texas, have invented new and useful Improvements in Wire-Tighteners, of which the following is a specification.

The invention relates to improvements in wire-tighteners, being designed especially to tighten fence-wires; and its objects are to provide a device of the kind that will be light and simple in construction, so that it can be easily carried from point to point of the fence, that will be strong and effective in use, and that cannot get out of repair. These objects are effected by the construction and novel arrangement of parts hereinafter described, pointed out in the claims, and illustrated in the accompanying drawings, in which—

Figure 1 represents a side view of the device when in position to tighten the wire, the rope upon which it is attached being dotted in. Fig. 2 represents the same when the rope is wound and the wire consequently tightened. Fig. 3 represents a side view of the device, with the rope wound in the opposite direction to that shown in Fig. 2. Fig. 4 is a sectional view of the device to show the pin on which the rope winds and the openings for the same, and Fig. 5 is a perspective view.

Referring to the accompanying drawings, A designates the wire-tightening device, composed, mainly, of the similar disks B B, situated a proper distance apart and firmly connected together by the bar or block C, which has its ends squared and inserted firmly in corresponding central openings in the disks, which cannot turn independently of each other.

Each disk has an arm or lever, D, extending outward from its periphery in the line of its radius, the two levers extending in opposite directions. Each arm or lever D is provided near its end with a handle, D', standing at right angles outward therefrom, so that the two handles extend in opposite directions, and each forms a crank-handle with the corresponding arm or lever.

E is a pin fitting into the corresponding openings, *e e*, made in the disks on one side of the central bar, C, and F is a similar pin, designed to fit into any two corresponding openings of the series of openings *f f*, made near the edges of the disks, concentric with their centers.

G is a rope used in connection with the disks, and having a hook, H, secured to one end, as shown.

The bar C is rounded between the disks, so that the rope will wind thereon without fraying or cutting.

To use the device, the end of the rope opposite that having the hook is attached to a proper support—one of the fence-posts, for instance—and the hook is attached to the end of the wire to be tightened. The pin E is then withdrawn from the openings *e e*, the device placed on the rope, the latter being between the disks, and the pin replaced. The rope is now between said pin and the central bar, C, and by turning the device either way, by means of the levers, it will be wound upon the said pin and bar, which will tighten the wire attached to the hook. When this is tight enough, the pin F is inserted in the two corresponding openings, *f*, immediately in rear of the rope, so that the latter cannot unwind. The wire is then secured to the post and the device removed.

Having described my invention, I claim—

1. The herein-described wire-tightening device, consisting of the parallel disks or sections having their centers secured firmly together by a transverse bar, and provided on their peripheries with similar oppositely-extending radial lever-arms, a transverse pin passing through corresponding openings in the disks or sections on one side of the central bar, and a rope passing between said bar and pin and having its ends adapted to be secured to a support and to the end of a wire, respectively, substantially as specified.

2. In a wire-tightener, the combination of the disks or sections connected by the central bar, the oppositely-pointing lever-arms, the transverse pin fitting into corresponding openings in the disks or sections on one side of the central bar, the locking-pin adapted to fit into any two corresponding openings of the concentric series of openings made in the disks, and a rope or similar device connecting the wire to be stretched with the disks and their connections, substantially as specified.

In testimony that I claim the foregoing as my own I have hereto affixed my signature in presence of two witnesses.

JAMES W. BOYD.

Witnesses:
J. E. NEEL,
DOM. BEAUCHAMP.